(12) United States Patent
Özlütürk

(10) Patent No.: US 6,498,784 B1
(45) Date of Patent: Dec. 24, 2002

(54) CANCELLATION OF PILOT AND TRAFFIC SIGNALS

(75) Inventor: Fatih M. Özlütürk, Port Washington, NY (US)

(73) Assignee: InterDigital Technology Corporation, Wilmington, DE (US)

(*) Notice: Subject to any disclaimer, the term of this patent is extended or adjusted under 35 U.S.C. 154(b) by 0 days.

(21) Appl. No.: 09/175,174

(22) Filed: Oct. 20, 1998

(51) Int. Cl.[7] .................................................. H04B 3/20
(52) U.S. Cl. ...................... 370/286; 370/320; 370/342; 375/144; 375/147; 375/148
(58) Field of Search ................. 375/144, 147, 375/148; 370/286, 320, 342

(56) References Cited

U.S. PATENT DOCUMENTS

| | | | |
|---|---|---|---|
| 5,224,122 A | 6/1993 | Bruckert et al. ............... 375/1 |
| 5,235,612 A * | 8/1993 | Stilwell et al. ................. 375/1 |
| 5,646,964 A * | 7/1997 | Ushirokawa et al. ........ 375/346 |
| 5,719,852 A | 2/1998 | Schilling et al. ............ 370/201 |
| 6,034,986 A * | 3/2000 | Yellin .......................... 375/200 |
| 6,067,333 A * | 5/2000 | Kim et al. .................... 375/346 |
| 6,154,443 A * | 11/2000 | Huang et al. ................ 370/210 |
| 6,192,067 B1 * | 2/2001 | Toda et al. ................... 375/144 |

FOREIGN PATENT DOCUMENTS

WO   9843362   10/1998   ........... H04B/15/00

\* cited by examiner

*Primary Examiner*—Douglas Olms
*Assistant Examiner*—Van Nguyen
(74) *Attorney, Agent, or Firm*—Volpe & Koenig, P.C.

(57) ABSTRACT

A global pilot and unwanted traffic signal canceler for a spread spectrum communication system receiver that reduces their contributive noise effects. The present invention effectively cancels the global pilot and unwanted, active traffic signals prior to decoding a desired traffic signal at the receiver. The system and method decreases the bit error rate (BER) yielding an increased signal-to-noise ratio.

15 Claims, 8 Drawing Sheets

Inphase bit stream (I)

quadrature bit stream (Q)

pn sequence (I or Q)

CANCELLATION OF PILOT AND TRAFFIC SIGNALS

BACKGROUND OF THE INVENTION

1. Field of the Invention

The present invention relates generally to digital communications. More specifically, the invention relates to a system and method which cancels the global pilot signal and unwanted traffic signals from a received code division multiple access signal thereby removing them as interferers prior to decoding.

2. Description of the Prior Art

Advanced communication technology today makes use of a communication technique in which data is transmitted with a broadened band by modulating the data to be transmitted with a pseudo-noise (pn) signal. The technology is known as digital spread spectrum or code divisional multiple access (CDMA). By transmitting a signal with a bandwidth much greater than the signal bandwidth, CDMA can transmit data without being affected by signal distortion or an interfering frequency in the transmission path.

Shown in FIG. 1 is a simplified, single channel CDMA communication system. A data signal with a given bandwidth is mixed with a spreading code generated by a pn sequence generator producing a digital spread spectrum signal. The signal which carries data for a specific channel is known as a traffic signal. Upon reception, the data is reproduced after correlation with the same pn sequence used to transmit the data. Every other signal within the transmission bandwidth appears as noise to the signal being despread.

For timing synchronization with a receiver, an unmodulated traffic signal known as a pilot signal is required for every transmitter. The pilot signal allows respective receivers to synchronize with a given transmitter, allowing despreading of a traffic signal at the receiver.

In atypical communication system, a base station communicates with a plurality of individual subscribers fixed or mobile. The base station which transmits many signals, transmits a global pilot signal common to the plurality of users serviced by that particular base station at a higher power level. The global pilot is used for the initial acquisition of an individual user and for the user to obtain signal-estimates for coherent reception and for the combining of multipath components during reception. Similarly, in a reverse direction, each subscriber transmits a unique assigned pilot for communicating with the base station.

Only by having a matching pn sequence can a signal be decoded, however, all signals act as noise and interference. The global pilot and traffic signals are noise to a traffic signal being despread. If the global pilot and all unwanted traffic signals could be removed prior to despreading a desired signal, much of the overall noise would be reduced, decreasing the bit error rate and in turn, improve the signal-to-noise ratio (SNR) of the despread signal.

Some attempts have been made to subtract the pilot signal from the received signal based on the relative strength of the pilot signal at the receiver. However, the strength value is not an accurate characteristic for calculating interference due to the plurality of received signals with different time delays caused by reflections due to terrain. Multipath propagation makes power level estimates unreliable.

There is a need to improve overall system performance by removing multiple noise contributors from a signal prior to decoding.

SUMMARY OF THE INVENTION

The present invention reduces the contributive noise effects of the global pilot signal and unwanted traffic signals transmitted in a spread spectrum communication system. The present invention effectively cancels the global pilot and unwanted traffic signal(s) from a desired traffic signal at a receiver prior to decoding. The resulting signal has an increased signal-to-noise ratio.

Accordingly, it is an object of the present invention to provide a code division multiple access communication system receiver which reduces the contributive noise effects from the pilot and active, unwanted traffic signals.

It is another object of the present invention to improve the desired traffic signal SNR by eliminating the noise effects of the global pilot and active traffic signals.

Other objects and advantages of the system and method will become apparent to those skilled in the art of advanced telecommunications after reading the detailed description of the preferred embodiment.

DESCRIPTION OF THE PREFERRED EMBODIMENTS

Figure 1:
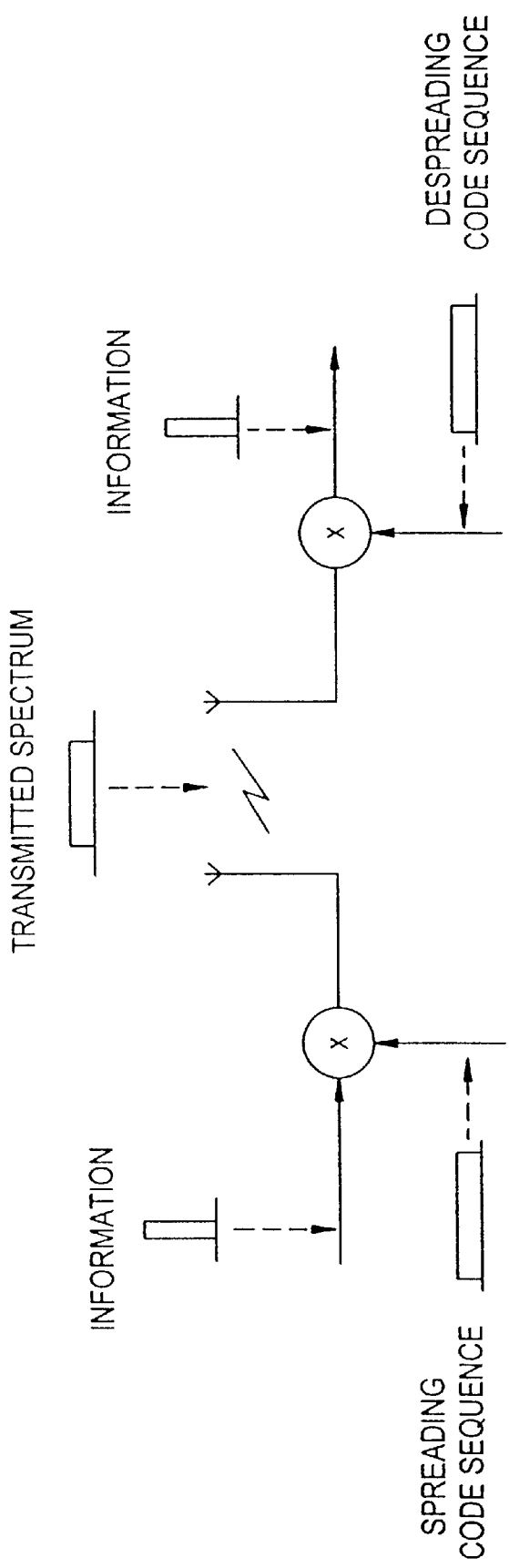
FIG. 1 is a simplified block diagram of a prior art, CDMA communication system.

The preferred embodiments will be described with reference to the drawing figures where like numerals represent like elements throughout.

Figure 2A:
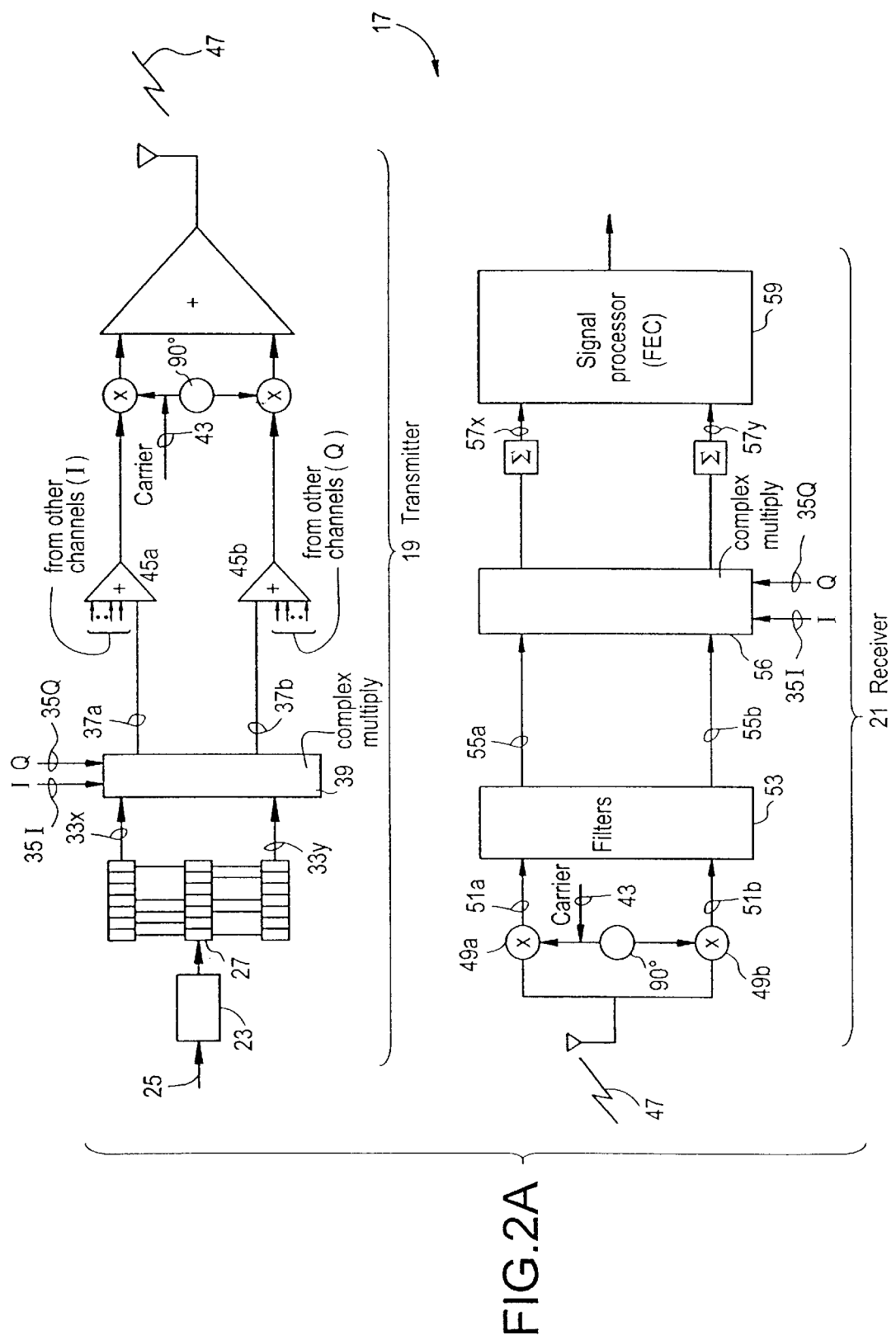
FIG. 2A is a detailed block diagram of a B-CDMA™ communication system.

A B-CDMA™ communication system 17 as shown in FIG. 2 includes a transmitter 19 and a receiver 21, which may reside in either a base station or a mobile user receiver. The transmitter 19 includes a signal processor 23 which encodes voice and nonvoice signals 25 into data at various bit rates.

By way of background, two steps are involved in the generation of a transmitted signal in a multiple access environment. First, the input data which can be considered a bi-phase modulated signal is encoded using forward error-correcting coding (FEC) 27. One signal is designated the in-phase channel I 33$x$. The other signal is designated the quadrature channel Q 33$y$. Bi-phase modulated I and Q signals are usually referred to as quadrature phase shift keying (QPSK).

Figure 2B:
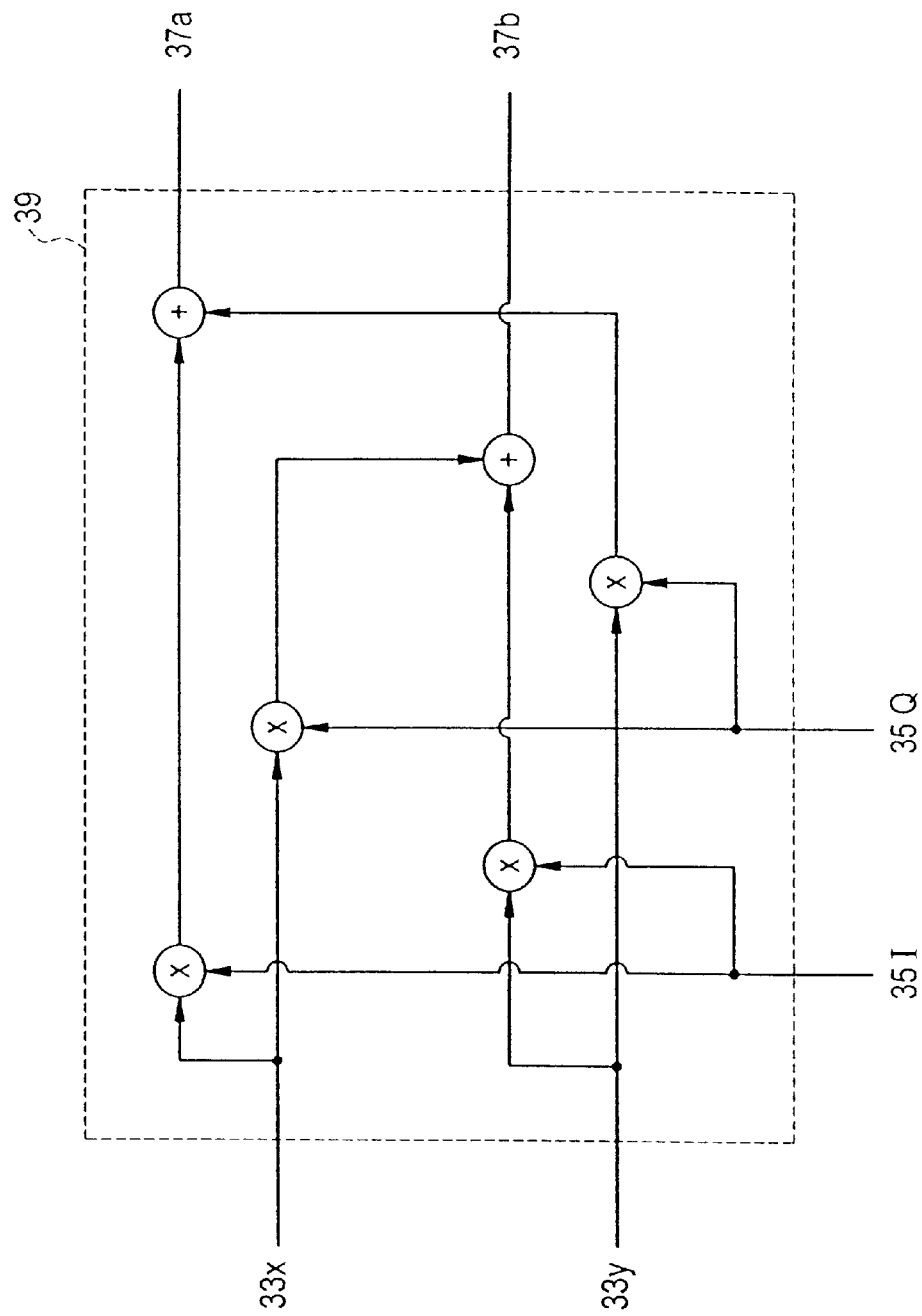
FIG. 2B is a detailed system diagram of a complex number multiplier.

In the second step, the two bi-phase modulated data or symbols 33$x$, 33$y$ are spread with a complex, pseudo-noise (pn) sequence 35I, 35Q using a complex number multiplier 39. The operation of a complex number multiplier 39 is shown in FIG. 2B and is well understood in the art. The spreading operation can be represented as:

$$(x+jy) \times (I+jQ) = (xI - yQ) + j(xQ + yI) = a + jb. \qquad \text{Equation (1)}$$

A complex number is in the form a+jb, where a and b are real numbers and $j^2 = -1$. Referring back to FIG. 2a, the resulting I 37a and Q 37b spread signals are combined 45a, 45b with other spread signals (channels) having different spreading codes, multiplied (mixed) with a carrier signal 43, and transmitted 47. The transmission 47 may contain a plurality of individual signals.

The receiver 21 includes a demodulator 49a, 49b which mixes down the transmitted broadband signal 47 with the transmitting carrier 43 into an intermediate carrier frequency 51a, 51b. A second down conversion reduces the signal to baseband. The QPSK signal 55a, 55b is then filtered 53 and mixed 56 with the locally generated complex pn sequence 35I, 35Q which matches the conjugate of the transmitted complex code. Only the original signals which were spread by the same code will be despread. All other signals will appear as noise to the receiver 21. The data 57x, 57y is coupled to a signal processor 59 where FEC decoding is performed on the convolutionally encoded data.

Figure 3A:
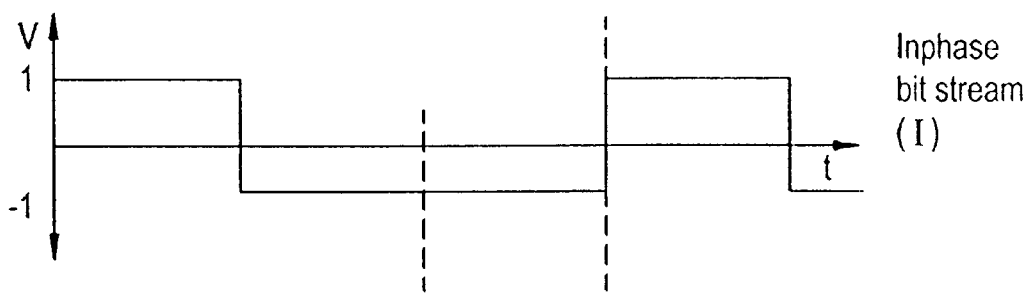
FIG. 3A is a plot of an in-phase bit stream.
Figure 3B:
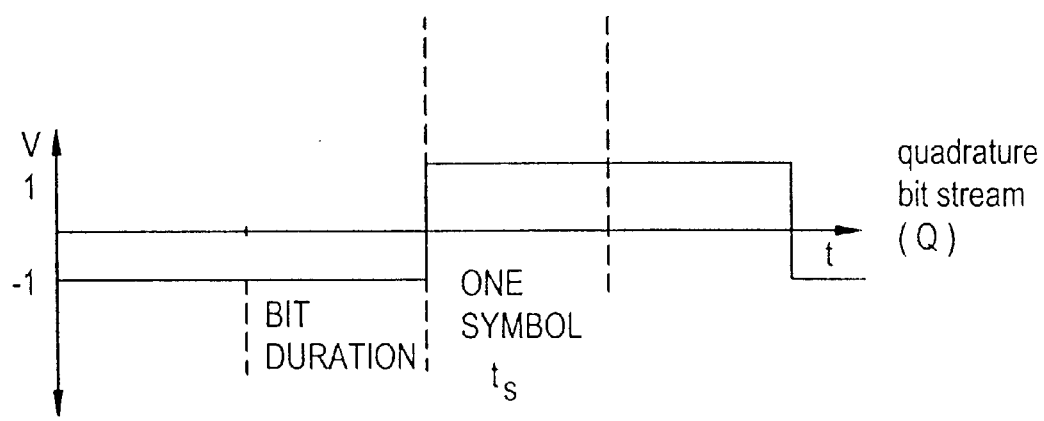
FIG. 3B is a plot of a quadrature bit stream.

As shown in FIGS. 3A and 3B, a QPSK symbol consists of one bit each from both the in-phase (I) and quadrature (Q) signals. The bits may represent a quantized version of an analog sample or digital data. It can be seen that symbol duration $t_s$ is equal to bit duration.

Figure 3C:
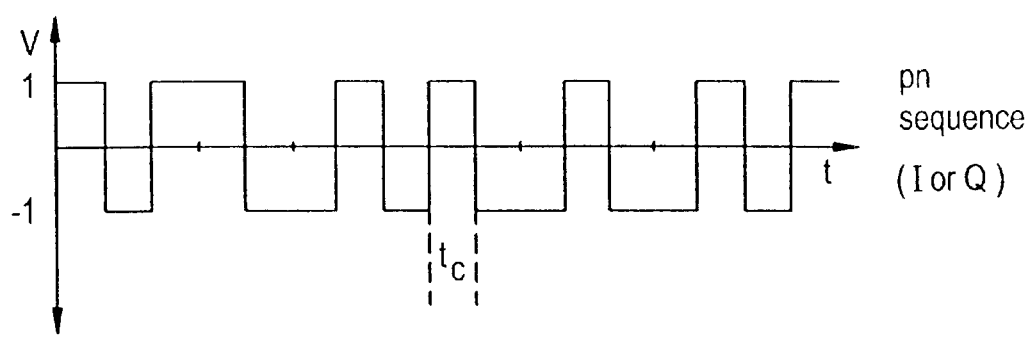
FIG. 3C is a plot of a pseudo-noise (pn) bit sequence.

The transmitted symbols are spread by multiplying the QPSK symbol stream by the complex pn sequence. Both the I and Q pn sequences are comprised of a bit stream generated at a much higher frequency, typically 100 to 200 times the symbol rate. One such pn sequence is shown in FIG. 3C. The complex pn sequence is mixed with the symbol bit stream producing the digital spread signal (as previously discussed). The components of the spread signal are known as chips having a much smaller duration $t_c$.

When the signal is received and demodulated, the baseband signal is at the chip level. When the I and Q components of the signal are despread using the conjugate of the pn sequence used during spreading, the signal returns to the symbol level.

Figure 4:
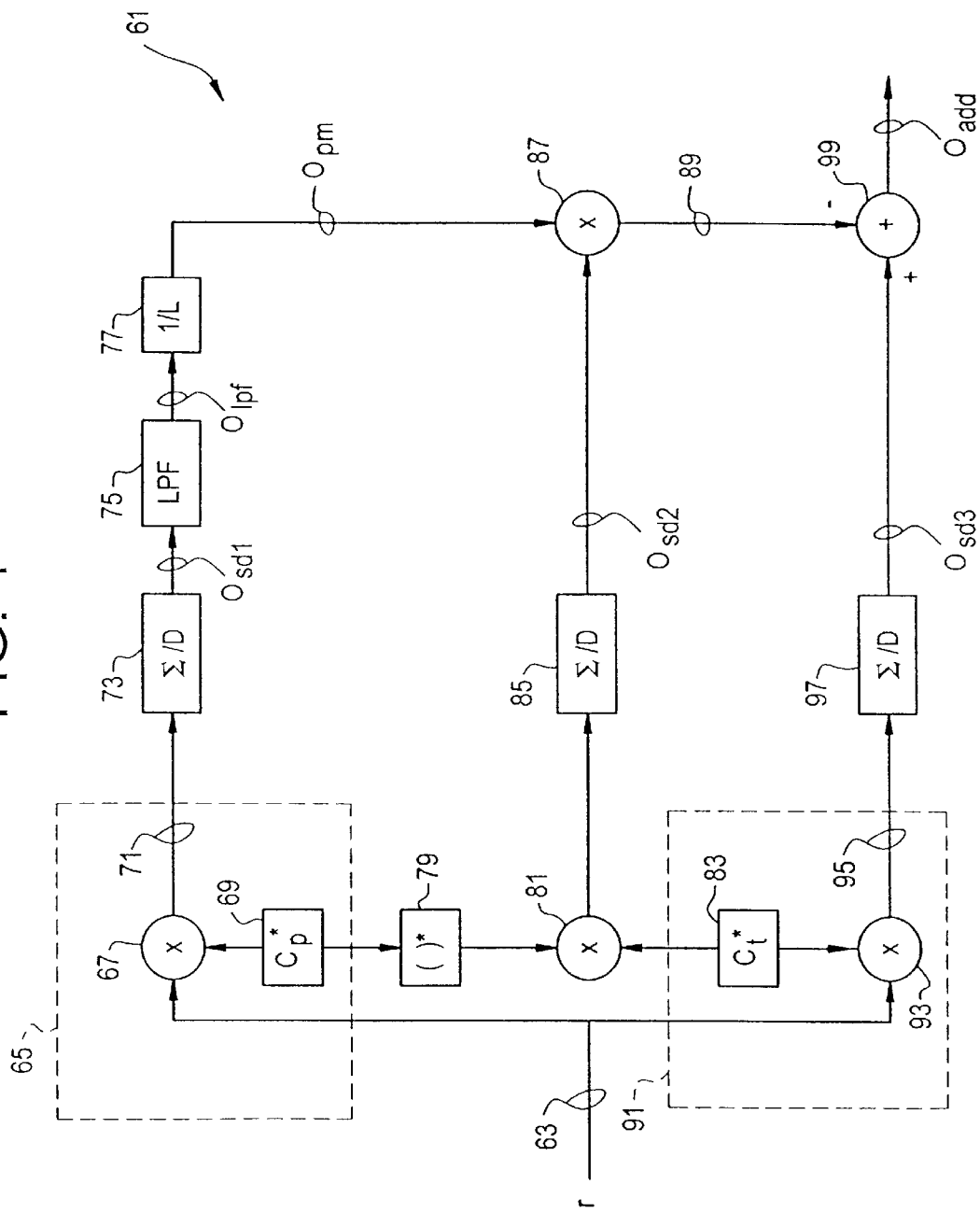
FIG. 4 is a block diagram of a global pilot signal cancellation system according to the present invention.
Figure 5:
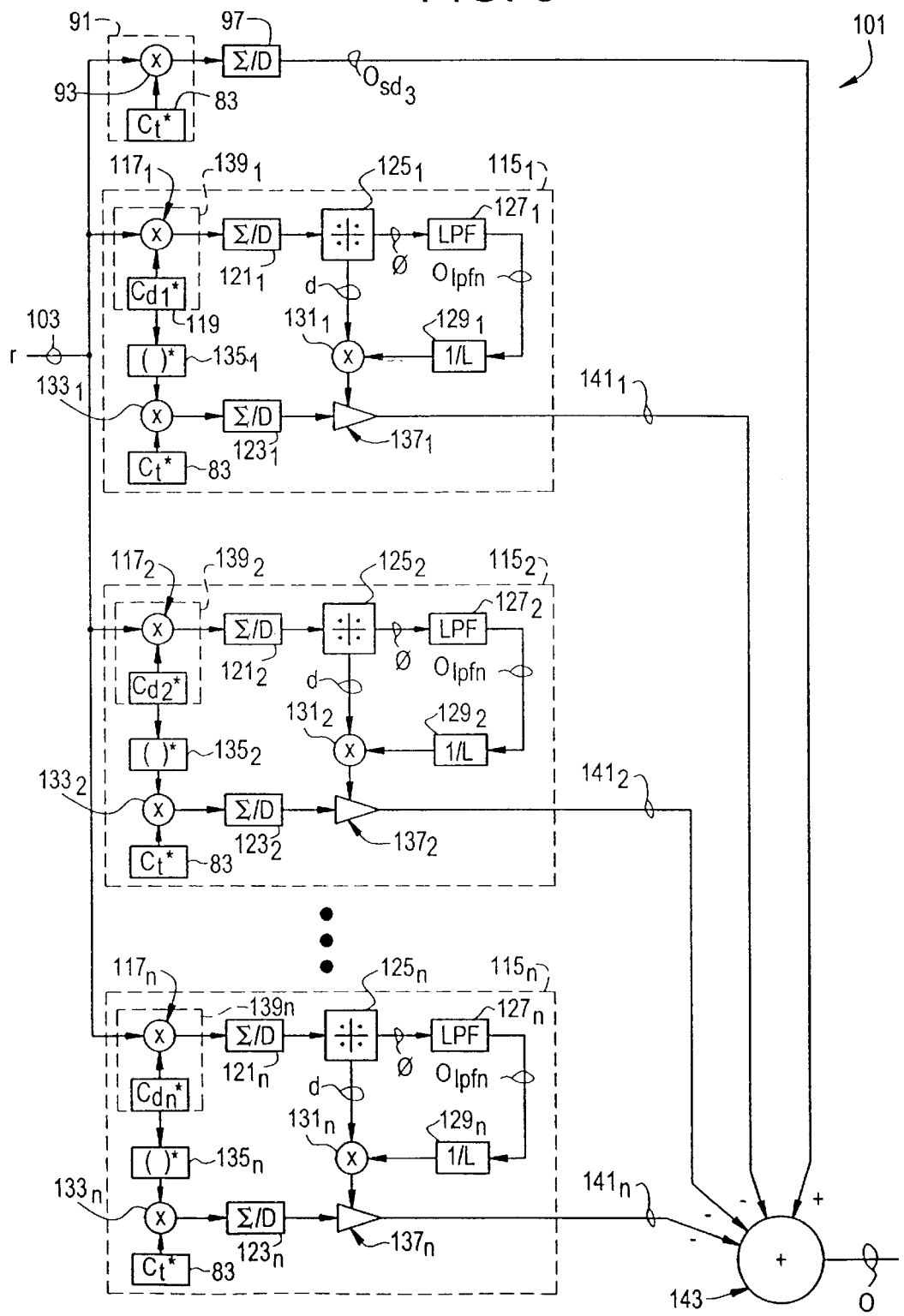
FIG. 5 is a block diagram of an unwanted traffic signal(s) cancellation system according to the present invention.
Figure 7:
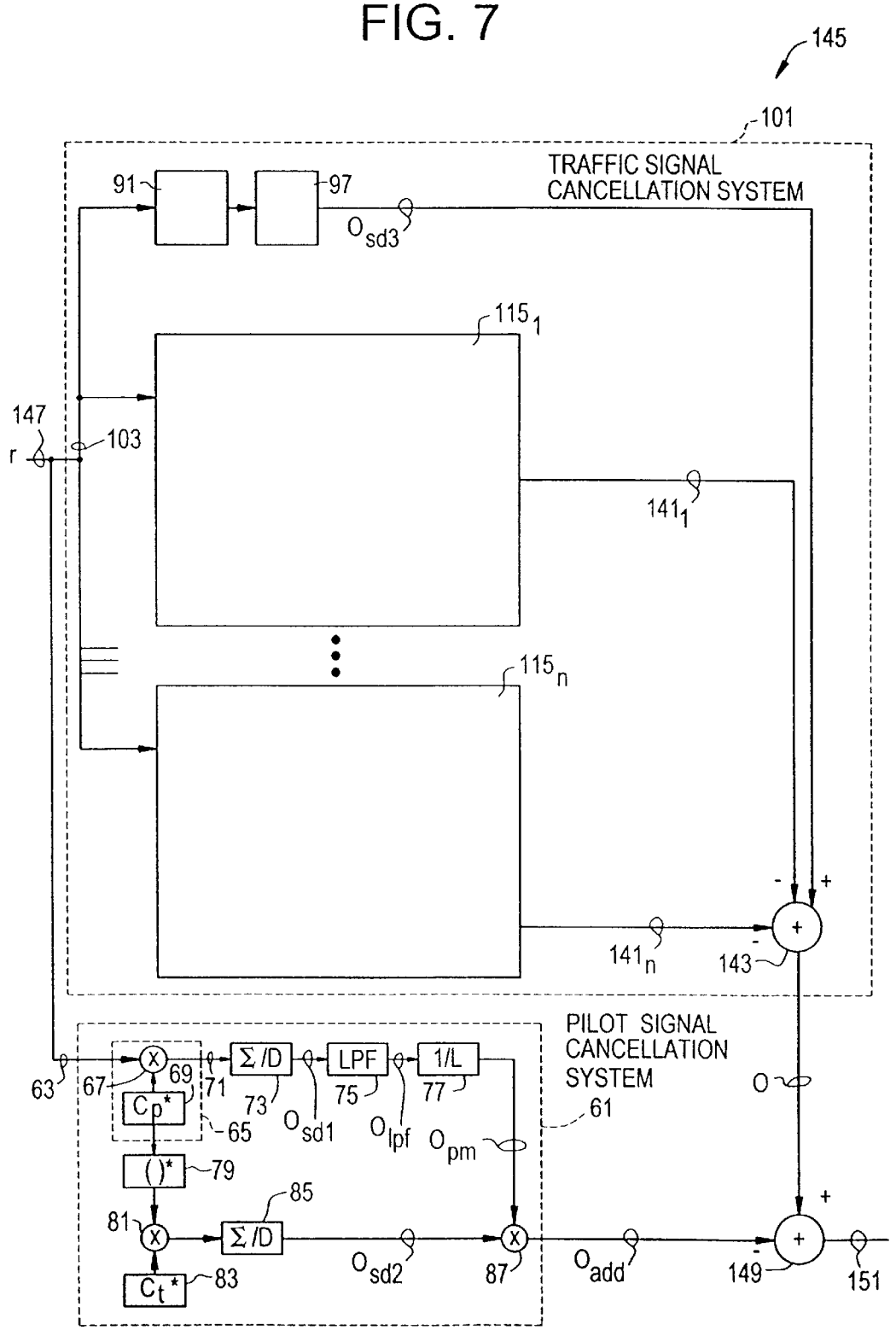
FIG. 7 is a block diagram of a combined pilot and unwanted traffic signal cancellation system according to the present invention.

The embodiments of the present invention are shown in FIGS. 4, 5 and 7. The global pilot signal cancellation system 61 embodiment is shown in FIG. 4. A received signal r is expressed as:

$$r = c_p + \beta c_t + n \qquad \text{Equation (2)}$$

where the received signal r is a complex number and is comprised of the pilot strength multiplied with the pilot code $c_p$, summed with the traffic strength $\beta$ multiplied with the traffic code $c_t$, summed with random noise n. The noise n includes all received noise and interference including all other traffic signals. To cancel the global pilot signal from the received signal r, the system 61 must derive the signal strength of the pilot code where:

$$\neq \beta \qquad \text{Equation (3)}$$

since the global pilot is transmitted at a higher power level than a traffic signal.

When the received signal r is summed over time, Equation (2) becomes:

$$\Sigma r = \Sigma c_p + \beta \Sigma c_t + \Sigma n. \qquad \text{Equation (4)}$$

Referring to FIG. 4, the received baseband signal r is input 63 into the pilot signal cancellation system 61 and into a pilot despreader 65 which despreads the pilot signal from the received signal r. First mixer 67 despreads the received signal r by multiplying with the complex conjugate $c_p^*$ 69 of the pilot pn code used during spreading yielding:

$$\Sigma r c_p^* = \Sigma c_p c_p^* + \beta \Sigma c_t c_p^* + \Sigma n c_p^*. \qquad \text{Equation (5)}$$

A complex conjugate is one of a pair of complex numbers with identical real parts and with imaginary parts differing only in sign.

The despread pilot signal 71 is coupled to a first sum and dump processor 73 where it is summed over time. The first sum and dump 73 output $O_{sd1}$ is:

$$O_{sd1} = L + \beta \Sigma c_t c_p^* + \Sigma n c_p^* \qquad \text{Equation (6)}$$

where L is the product of the pilot spreading code $c_p$ and the complex conjugate of the pilot spreading code $c_p^*$ summed over L chips.

The sum and dump 73 output $O_{sd1}$ is coupled to a low pass filter 75. The low pass filter 75 determines the mean value for each signal component. The mean value for pilot-traffic cross-correlation is zero and so is the mean value of the noise n. Therefore, after filtering 75, the second and third terms in Equation (6) become zero. The low pass filter 75 output $O_{lpf}$ over time is:

$$O_{lpf} + L. \qquad \text{Equation (7)}$$

The low pass filter 75 output $O_{lpf}$ is coupled to a processing means 77 to derive the pilot code strength. The processing means 77 calculates by dividing the low pass filter 79 output $O_{lpf}$ by L. Thus, the processing means 77 output $O_{pm}$ is:

$$O_{pm} = . \qquad \text{Equation (8)}$$

The pilot spreading code $c_p^*$ complex conjugate generator 69 is coupled to a complex conjugate processor 79 yielding the pilot spreading code $c_p$. The pilot spreading code $c_p$ is input to a second mixer 81 and mixed with the output of a traffic spreading code $c_t^*$ complex conjugate generator 83. The resulting product from the second mixer 81 output is coupled to a second sum and dump processor 85. The output $O_{sd2}$ of the second sum and dump processor 85 is $\Sigma c_p c_t^*$ and is combined with at a third mixer 87. The third mixer 87 output 89 is $\Sigma c_p c_t^*$.

The received signal r is also despread by traffic despreader 91. The traffic despreader 91 despreads the received signal r by mixing the received signal r with the traffic code $c_t^*$ complex conjugate generator 83 using a fourth mixer 93 yielding:

$$\Sigma r c_t^* = \Sigma c_p c_t^* + \beta \Sigma c_t c_t^* + \Sigma n c_t^*. \qquad \text{Equation (9)}$$

The traffic despreader 91 output 95 is coupled to a third sum and dump 97. The third sum and dump 97 output $O_{sd3}$ over time is:

$$O_{sd3} = \Sigma r c_t^* = \beta L + \Sigma c_p c_t^* \qquad \text{Equation (10)}$$

where L is the product of the traffic spreading code $c_t$ and the complex conjugate of the traffic spreading code $c_t^*$ summed over L chips.

The third sum and dump 97 output $O_{sd3}$ is coupled to an adder 99 which subtracts the third mixer 87 output 89. The adder 99 output $O_{add}$ is:

$$O_{add} = \beta L + \Sigma c_p c_t^* + \Sigma n c_t^* - \Sigma c_p c_t^*. \qquad \text{Equation (11)}$$

Thus, the pilot canceler 61 output $O_{add}$ is equal to the received signal r minus the pilot signal simplified below:

$$O_{add} = \beta L + \Sigma n c_t^*. \qquad \text{Equation (12)}$$

The invention uses a similar approach to cancel unwanted traffic signal(s) from a desired traffic signal. While traffic signals are interference to other traffic signals just as the global pilot signal is, unwanted traffic signal cancellation differs from global pilot signal cancellation since a traffic signal is modulated by the data and is therefore dynamic in nature. A global pilot signal has a constant phase, whereas a traffic signal constantly changes phase due to data modulation.

The traffic signal canceler system 101 embodiment is shown in FIG. 5. As above, a received signal r is input 103 to the system:

$$r = \psi d c_d + \beta c_t + n \qquad \text{Equation (13)}$$

where the received signal r is a complex number and is comprised of the traffic code signal strength $\psi$ multiplied with the traffic signal data d and the traffic code $c_d$ for the unwanted traffic signal to be canceled, summed with the desired traffic code strength $\beta$ multiplied with the desired traffic code $c_t$, summed with noise n. The noise n includes all received noise and interference including all other traffic signals and the global pilot signal. To cancel the unwanted traffic signal(s) from the received signal r, the system 101 must derive the signal strength of the unwanted traffic code $\psi$ to be subtracted and estimate the data d, where:

$$\psi \neq d \neq \beta. \qquad \text{Equation (14)}$$

When the received signal r is summed over time, Equation 13 can be expressed as:

$$\Sigma r + \psi d \Sigma c_d + \beta \Sigma c_t + \Sigma n. \qquad \text{Equation (15)}$$

Referring to FIG. 5, the received baseband signal r is input 103 into the desired traffic signal despreader 91 which despreads the desired traffic signal from the received signal r. Desired traffic signal mixer 93 mixes the received signal r with the complex conjugate $c_t^*$ of the desired traffic pn code used during spreading. The despread traffic signal is coupled to a sum and dump processor 97 and summed over time. The sum and dump 97 output $O_{sd3}$ is:

$$O_{ad3} = \Sigma r c_t^* = \beta L + \psi d \Sigma c_d c_t^* + \Sigma n c_t^*. \qquad \text{Equation (16)}$$

The traffic signal canceler system 101 shown in FIG. 5 includes n unwanted traffic signal cancelers 115₁–115ₙ. An exemplary embodiment includes 10 (where n=10) unwanted traffic signal cancelers 115₁–115₁₀.

Each unwanted traffic signal canceler 115₁–115ₙ comprises: an unwanted traffic signal despreader 139₁–139ₙ that includes a first mixer 117₁–117ₙ, and an unwanted traffic signal code generator 119₁–119ₙ, second 133₁–133ₙ mixer, first 121₁–121ₙ and second 123₁–123ₙ sum and dump processors, a hard decision processor 125₁–125ₙ, a low pass filter 127₁–127ₙ, a processing means 129₁–129ₙ, third mixer 131₁–131ₙ, a conjugate processor 135₁–135ₙ, an adjustable amplifier 137₁–137ₙ, and a desired traffic signal code generator 83.

As above, the received signal r is input 103 into each unwanted traffic canceler 115₁–115ₙ. The unwanted traffic signal despreader 139₁–139ₙ is coupled to the input 103 where the received signal r is mixed 117₁–117ₙ with the complex conjugate $c_{d1}^* - c_{dn}^*$ of the traffic pn sequence for each respective unwanted signal. The despread 139₁–139ₙ traffic signal is coupled to a first sum and dump processor 121₁–121ₙ where it is summed over time. The first sum and dump 121₁–121ₙ output $O_{sd1n}$ is:

$$O_{sd1n} = \Sigma r c_{dn}^* = \psi d L + \beta \Sigma c_t c_{dn}^* + \Sigma n c_{dn}^*. \qquad \text{Equation (17)}$$

where L is the product of the unwanted traffic signal spreading code $c_{dn}$ and $c_{dn}^*$ is the complex conjugate of the unwanted traffic signal spreading code.

The first sum and dump 121₁–121ₙ output $O_{sd1n}$ is coupled to the hard decision processor 125₁–125ₙ. The hard decision processor 125₁–125ₙ determines the phase shift $\phi$ in the data due to modulation. The hard decision processor 125₁–125ₙ also determines the QPSK constellation position d that is closest to the despread symbol value.

Figure 6:
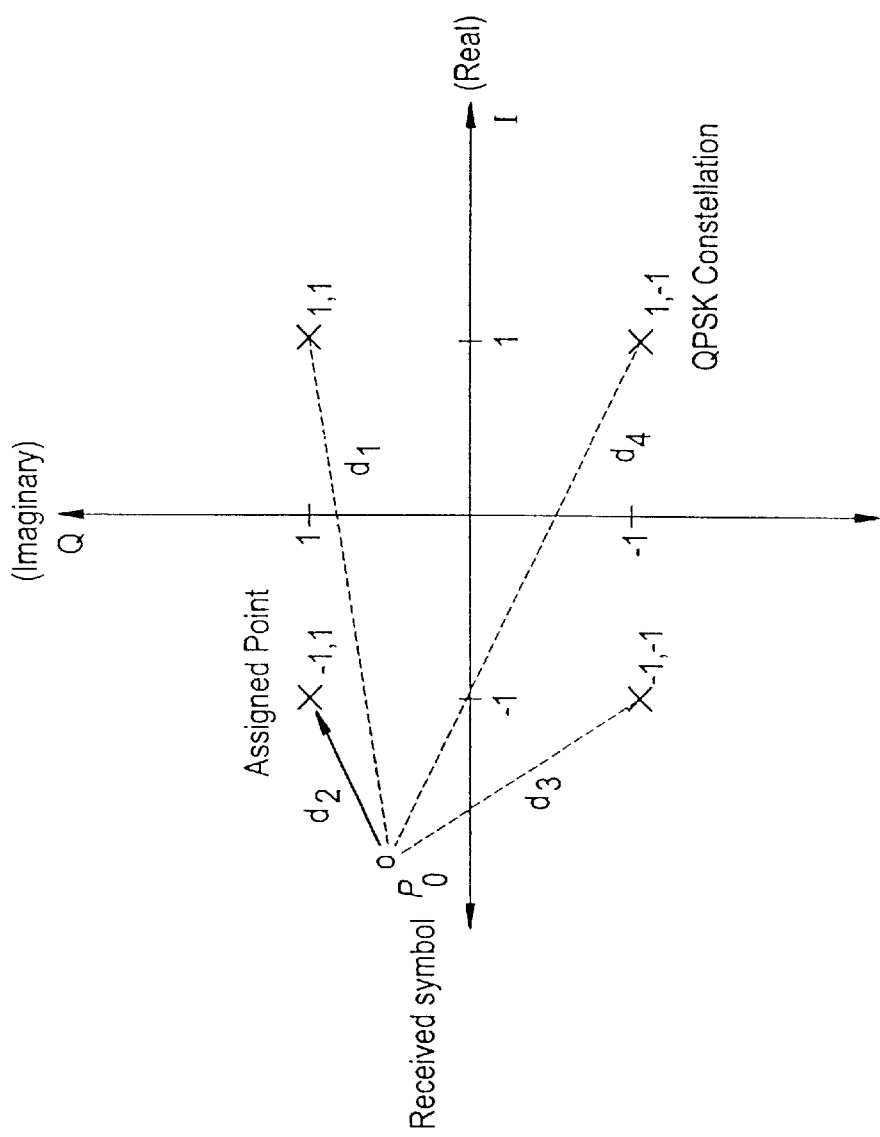
FIG. 6 is a diagram of a received symbol $p_o$ on the QPSK constellation showing a hard decision.

As shown in FIG. 6, the hard decision processor 125₁–125ₙ compares a received symbol $p_o$ of a signal to the four QPSK constellation points $x_{1,1}, x_{-1,1}, x_{-1,-1}, x_{1,-1}$. It is necessary to examine each received symbol $p_o$ due to corruption during transmission 47 by noise and distortion, whether multipath or radio frequency. The hard decision processor computes the four distances $d_1, d_2, d_3, d_4$ to each quadrant from the received symbol $p_o$ and chooses the shortest distance $d_2$ and assigns that symbol d location $x_{-1,1}$. The hard decision processor also derotates (rotates back) the original signal coordinate $p_o$ by a phase amount $\phi$ that is equal to the phase corresponding to the selected symbol location $x_{-1,1}$. The original symbol coordinate $p_o$ is discarded.

The hard decision processor 125₁–125ₙ phase output $\phi$ is coupled to a low pass filter 127₁–127ₙ. Over time, the low pass filter 127₁–127ₙ determines the mean value for each signal component. The mean value of the traffic-to-traffic cross-correlation and also the mean value of the noise n are zero. Therefore, the low pass filter 127₁–127ₙ output $O_{lpfn}$ over time is:

$$O_{lpfn} = \psi L. \qquad \text{Equation (18)}$$

The low pass filter 127₁–127ₙ output $O_{lpfn}$ is coupled to the processing means 129₁–129ₙ to derive the unwanted traffic signal code strength $\phi$. The processing means 129₁–129ₙ estimates $\phi$ by dividing the filter 127₁–127ₙ output $O_{lpfn}$ by L.

The other hard decision processor 125₁–125ₙ output is data d. This is the data point d corresponding to the smallest of the distances $d_1, d_2, d_3$ or $d_4$ as shown in FIG. 6. Third mixer 131₁–131ₙ mixes the unwanted traffic signal strength $\psi$ with each date value d.

The unwanted traffic signal spreading code complex conjugate generator $c_{d1}^* - c_{dn}^*$ is coupled to the complex conjugate processor 135₁–135ₙ yielding the unwanted traffic signal spreading code $c_{d1}-c_{dn}$ and is input to the second mixer 133₁–133ₙ and mixed with the output of desired traffic signal spreading code complex conjugate generator $c_t^*$. The product is coupled to the second sum and dump processor 123₁–123ₙ. The second sum and dump processor 123₁–123ₙ output $O_{sd2n}$ is $\Sigma c d_n c_t^*$ and is coupled to variable amplifier 137₁–137ₙ. Variable amplifier 137₁–137ₙ amplifies the second sum and dump processor 123₁–123ₙ output $O_{sd2n}$ in accorance with the third mixer 131₁–131ₙ output which is the determined gain.

The variable amplifier 137₁–137ₙ output 141₁–141ₙ is coupled to an adder 143 which subtracts the output from each variable amplifier 137₁–137ₙ from the output of the desired traffic signal despreader 105. The output O is:

$$O = \beta L + \psi d \Sigma c_d c_t^{*+\Sigma nc_t^*} - \psi d \Sigma c_d c_t^*. \qquad \text{Equation (19)}$$

The adder 143 output O (also the unwanted traffic canceler system 101 output) is equal to the received signal r minus the unwanted traffic signals simplified below:

$$O = \beta L + \Sigma n c_t^* \qquad \text{Equation (20)}$$

where the noise n varies depending on the amount of traffic signals subtracted from the received signal.

Another embodiment 145 cancelling the global pilot signal and unwanted traffic signals is shown in FIG. 7. As previously discussed, the unwanted traffic cancellation system 101 includes the desired traffic signal despreader 91 and a plurality of unwanted traffic signal cancelers 115₁–115ₙ. The traffic cancellation system is coupled in parallel with the pilot cancellation system 61 previously described, but without a desired traffic singal despreader. A common input 147 is coupled to both systems 101, 61 with a common adder 149 which is coupled to the outputs O, $O_{add}$ from both systems 101, 61. The pilot and unwanted traffic signals are subtracted from the desired traffic signal yielding an output 151 free of interference contributions by the pilot and plurality of transmitted traffic signals.

While specific embodiments of the present invention have been shown and described, many modifications and variations could be made by one skilled in the art without departing from the spirit and scope of the invention. The above description serves to illustrate and not limit the particular form in any way.

I claim:

1. A cancellation system for use in a receiver that receives communication signals from a transmitter over a CDMA air interface that removes unwanted traffic signals from a desired traffic signal prior to decoding, the system comprising:

an input for receiving the communication signals;

said input coupled to a desired traffic signal despreader having an output;

said input coupled to an unwanted traffic signal canceler having an output;

said unwanted traffic signal canceler output subtracted from said desired traffic signal output as the cancellation system output; and said output is the desired traffic signal free from unwanted traffic signals.

2. The cancellation system according to claim 1 wherein said unwanted traffic signal canceler further comprises:

an unwanted traffic signal despreader having an input coupled to said input and a summed output;

said unwanted traffic signal canceler output coupled to a hard decision processor having a phase output and a data output;

said hard decision processor phase output coupled to a low pass filter, said low pass filter having an output;

said low pass filter output coupled to an input of a processor that filters and removes the product of the unwanted traffic signal to desired traffic signal cross-correlation outputting the unwanted traffic signal strength;

said processor output multiplied with said hard decision data output with a first multiplier having an output;

said unwanted traffic code generator output coupled to an input of a complex conjugate processor having an output;

said complex conjugate output mixed with a complex conjugate of the desired traffic signal code, said first mixer having an output;

said first mixer output coupled to an input of a first sum and dump processor having an output;

said first sum and dump processor coupled to an input of an amplifier having an adjustable gain controlled by said first multiplier output; and said output of said amplifier is the unwanted traffic signal strength.

3. The cancellation system according to claim 2 further comprising a global pilot signal canceler.

4. The cancellation system according to claim 3 wherein said global pilot signal canceler comprises:

a global pilot despreader coupled to said input having a summed output;

a desired traffic signal and global pilot cross-correlation means;

said global pilot despreader output coupled to a pilot strength determining means, said determining means having an output;

said pilot strength determining means output multiplied with said cross-correlation means output; and said multiplied product is said selective signal canceler output.

5. The cancellation system according to claim 4 wherein said cross-correlation means comprises:

a global pilot signal code generator;

a desired traffic signal complex conjugate code generator;

a second mixer for cross-correlating said global pilot signal code and said desired traffic signal complex conjugate code; and a second sum and dump processor for summing over time said cross-correlation product.

6. The cancellation system according to claim 5 wherein said means to derive said global pilot signal strength further comprises:

a low-pass filter having an output; and a processor coupled to said low-pass filter deriving and outputting the global pilot signal strength.

7. The cancellation system according to claim 1 further comprising a global pilot signal canceler.

8. The cancellation system according to claim 7 wherein said global pilot signal canceler comprises:

a global pilot despreader coupled to said input having a summed output;

a desired traffic signal and global pilot cross-correlation means;

said global pilot despreader output coupled to a pilot strength determining means, said determining means having an output;

said pilot strength determining means output multiplied with said cross-correlation means output; and said multiplied product is said global pilot signal canceler output.

9. The cancellation system according to claim 8 wherein said cross-correlation means comprises:

a global pilot signal code generator;

a desired traffic signal complex conjugate code generator;

a mixer for cross-correlating said global pilot signal code and said desired traffic signal complex conjugate code; and a sum and dump processor for summing over time said cross-correlation product.

10. The cancellation system according to claim 9 wherein said means to derive said global pilot signal strength further comprises:

a low-pass filter having an output; and a processor coupled to said low-pass filter deriving and outputting the global pilot signal strength.

11. A global pilot signal cancellation system for use in a receiver that receives communication signals from a transmitter over a CDMA air interface that removes the global pilot signal from a desired traffic signal prior to decoding, the system comprising:

an input for receiving the communication signals and a system output;

said input coupled to a global pilot despreader and a desired traffic signal despreader each having a summed output;

a desired traffic signal and global pilot cross-correlation means;

said global pilot despreader output coupled to a pilot strength determining means, said determining means having an output;

said pilot strength determining means output multiplied with said cross-correlation means output; and said multiplied product subtracted from said desired traffic signal despreader output outputting the desired traffic signal free from the global pilot signal.

12. The global pilot signal cancellation system according to claim 11 wherein said cross-correlation means comprises:

a global pilot signal code generator;

a desired traffic signal complex conjugate code generator;

a mixer for cross-correlating said global pilot signal code and said desired traffic signal complex conjugate code; and a sum and dump processor for summing over time said cross-correlation product.

13. The global pilot signal cancellation system according to claim 12 wherein said means to derive said global pilot signal strength further comprises:

a low-pass filter having an output; and a processor coupled to said low-pass filter deriving and outputting the global pilot signal strength.

14. A traffic signal canceler system for use in a receiver that receives communication signals from a transmitter over a CDMA air interface that removes at least one unwanted traffic signal from a desired traffic signal prior to decoding, the system comprising:

an input for receiving the communication signals and a system output;

said input coupled to a desired traffic signal despreader having a summed output;

at least one unwanted traffic signal processors, having an input coupled to said input and each having an output; and each of said plurality of unwanted traffic signal processors output subtracted from said desired traffic signal despreader output outputting said desired traffic signal free from the plurality of unwanted traffic signals.

15. The traffic signal cancellation system according to claim 14 wherein said unwanted traffic signal canceler processor further comprises:

an unwanted traffic signal despreader having an input coupled to said input and a summed output;

said unwanted traffic signal canceler output coupled to a hard decision processor having a phase output and a data output;

said hard decision processor phase output coupled to a low pass filter, said low pass filter having an output;

said low pass filter output coupled to an input of a processor that filters and removes the product of the unwanted traffic signal to desired traffic signal cross-correlation outputting the unwanted traffic signal strength;

said processor output multiplied with said hard decision data output with a multiplier having an output;

said unwanted traffic code generator output coupled to an input of a complex conjugate processor having an output;

said complex conjugate output mixed with a complex conjugate of the desired traffic signal code, said mixer having an output;

said mixer output coupled to an input of a second sum and dump processor having an output;

said sum and dump processor coupled to an input of an amplifier having an adjustable gain controlled by said multiplier output; and said output of said amplifier is the unwanted traffic signal strength.

* * * * *

UNITED STATES PATENT AND TRADEMARK OFFICE
CERTIFICATE OF CORRECTION

PATENT NO. : 6,498,784 B1
DATED : December 24, 2002
INVENTOR(S) : Fatih M. Ozluturk It is certified that error appears in the above-identified patent and that said Letters Patent is hereby corrected as shown below:

Column 1,
Line 36, delete "atypical," and insert therefor -- a typical --.

Column 3,
Line 40, Equation (2), delete "$r = c_p + \beta c_t + n$," and insert therefor
-- $r = \propto c_p + \beta c_t + n$ --.

Line 42, after the word "strength," and before the word "multiplied," insert therefor -- $\propto$ --.

Line 48, after the word "code," and before the word "where," insert therefor -- $\propto$ --.
Line 50, Equation (3), delete "$\neq \beta$," and insert therefor -- $\propto \neq \beta$ --.

Line 56, Equation (4), delete "$\Sigma r = \Sigma c_p + \beta \Sigma c_t + \Sigma n$," and insert therefor -- $\Sigma r = \propto \Sigma c_p + \beta \Sigma c_t + \Sigma n$ --.

Line 64, Equation (5), delete "$\Sigma r c_p^* = \Sigma c_p c_p^* + \beta \Sigma c_t c_p^* + \Sigma n c_p^*$," and insert therefor
-- $\Sigma r c_p^* = \propto \Sigma c_p c_p^* + \beta \Sigma c_t c_p^* + \Sigma n c_p^*$ --.

Column 4,
Line 5, Equation (6), delete "$O_{sd1} = L + \beta \Sigma c_t c_p^* + \Sigma n c_p^*$," and insert therefor -- $O_{sd1} = \propto L + \beta \Sigma c_t c_p^* + \Sigma n c_p^*$ --.
Line 17, Equation (7), delete "$O_{lpf} + L$," and insert therefor -- $O_{lpf} = \propto L$ --.
Line 19, after the word "strength," and before the word "The," insert therefor -- $\propto$ --.
Line 20, after the word "calculates," and before the word "by," insert therefor -- $\propto$ --.
Line 24, Equation (8), delete "$O_{pm} = .$" and insert therefor -- $O_{pm} = \propto.$ --.
Line 33, after the word "with," and before the word "at," insert therefor -- $\propto$ --.
Line 34, after the word "is," delete "$\Sigma c_p c_t^*$," and insert therefor -- $\propto \Sigma c_p c_t^*$ --.
Line 40, Equation (9), delete "$\Sigma r c_t^* = \Sigma c_p c_t^* + \beta \Sigma c_t c_t^* \Sigma n c_t^*$," and insert therefor -- $\Sigma r c_t^* = \propto \Sigma c_p c_t^* + \beta \Sigma c_t c_t^* + \Sigma n c_t^*$ --.
Line 45, Equation (10), delete "$O_{sd3} = \Sigma r c_t^* = \beta L + \Sigma c_p c_t^*$," and insert therefor
-- $O_{sd3} = \Sigma r c_t^* = \beta L + \propto \Sigma c_p c_t^* + \Sigma n c_t^*$ --.
Line 54, Equation (11), delete "$O_{add} = \beta L + \Sigma c_p c_t^* + \Sigma n c_t^* - \Sigma c_p c_t^*$," and insert therefor
-- $O_{add} = \beta L + \propto \Sigma c_p c_t^* + \Sigma n c_t^* - \propto \Sigma c_p c_t^*$ --.

UNITED STATES PATENT AND TRADEMARK OFFICE
CERTIFICATE OF CORRECTION

PATENT NO. : 6,498,784 B1
DATED : December 24, 2002
INVENTOR(S) : Fatih M. Ozluturk It is certified that error appears in the above-identified patent and that said Letters Patent is hereby corrected as shown below:

<u>Column 5,</u>
Line 32, Equation (16), delete "$O_{ad3} = \Sigma rc_t^* = \beta L + \psi d\Sigma c_d c_t^* + \Sigma nc_t^*$," and insert therefor -- $O_{sd3} = \Sigma rc_t^* = \beta L + \psi d\Sigma c_d c_t^* + \Sigma nc_t^*$ --.

<u>Column 6,</u>
Line 23, after the word "strength," delete "$\phi$," anc insert therefor -- $\psi$ --.

Line 48, Equation (19), delete  and insert therefor -- $O = \beta L + \psi d\Sigma c_d c_t^* + \Sigma nc_t^* - \psi d\Sigma c_d c_t^*$ --.

Signed and Sealed this

Eighth Day of July, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,498,784 B1
DATED        : December 24, 2002
INVENTOR(S)  : Ozluturk et al.

It is certified that error appears in the above-identified patent and that said Letters Patent is hereby corrected as shown below:

<u>Title page,</u>
Item [75], Inventor, insert -- Nadir Sezgin --.

Signed and Sealed this

Fifteenth Day of November, 2005

JON W. DUDAS
*Director of the United States Patent and Trademark Office*